United States Patent [19]

DeNatale

[11] Patent Number: 5,095,384
[45] Date of Patent: Mar. 10, 1992

[54] LASER DAMAGE RESISTANT VANADIUM DIOXIDE FILMS

[75] Inventor: Jeffrey F. DeNatale, Thousand Oaks, Calif.

[73] Assignee: The United States of America as represented by the Secretary of the Air Force, Washington, D.C.

[21] Appl. No.: 608,064

[22] Filed: Oct. 26, 1990

[51] Int. Cl.$^5$ .......................... G02F 1/01; G02F 1/03
[52] U.S. Cl. ...................................... 359/288; 359/241
[58] Field of Search ................. 350/353; 359/288, 241

[56] References Cited

U.S. PATENT DOCUMENTS

| | | | |
|---|---|---|---|
| 3,853,783 | 12/1974 | Tucker | 252/300 |
| 4,283,113 | 8/1981 | Eden | 350/353 |
| 4,614,913 | 9/1986 | Honeycutt et al. | 330/4.3 |
| 4,622,174 | 11/1986 | McKoy et al. | 252/582 |
| 4,885,114 | 12/1989 | Gordon et al. | 252/589 |
| 4,890,075 | 12/1989 | Pohlmann et al. | 330/4.3 |
| 4,901,738 | 2/1990 | Brink et al. | 128/849 |

Primary Examiner—Rolf Hille
Assistant Examiner—Robert P. Limanek
Attorney, Agent, or Firm—Bobby D. Scearce; Donald J. Singer

[57] ABSTRACT

An optical device structure having enhanced resistance to damage by invasive laser radiation is described which comprises a thin layer of optical switching material, such as $VO_2$, deposited onto a lattice matched substrate. A method for fabricating the structure is also described.

11 Claims, 4 Drawing Sheets ns 5,095,384

LASER DAMAGE RESISTANT VANADIUM DIOXIDE FILMS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical devices having resistance to laser damage, and more particularly to a thin film structure and method for making same having enhanced resistance to damage by laser irradiation.

Laser resistant structures comprising optical switching materials are well developed for applications such as laser output couplers, optical filters, modulators and the like. A typical switching material transitions from substantial transparency characteristic of a non-metallic (semiconductor) insulating phase below a characteristic transition temperature to substantial opacity characteristic of a metallic conducting phase above that temperature over a broad range of wavelengths.

Vanadium dioxide ($VO_2$) switches upon being heated to about 68° C. from the monoclinic structure to the tetragonal structure, with concurrent significant changes in electrical and optical properties which render the material highly useful in laser power limiting devices. However, thin $VO_2$ films or layers in existing devices have an undesirably low damage threshold, and may experience failure through film delamination, substrate damage or film meltdown under very high energy density exposure. Structures incorporating $VO_2$ films having enhanced damage resistance are therefore needed.

The invention provides a thin film structure and method for making same having enhanced resistance to damage from invasive high energy laser radiation as compared to structures prepared conventionally. A structure according to the invention a film of optical switching material deposited onto a lattice matched substrate. Selective substrate surface preparation according to an aspect of the invention further enhances damage resistance of the deposited film.

It is therefore a principal object of the invention to provide a film structure which is resistant to damage from invasive laser radiation.

It is a further object of the invention to provide method for fabricating a laser damage resistant structure.

These and other objects of the invention will become apparent as a detailed description of representative embodiments proceeds.

SUMMARY OF THE INVENTION

In accordance with the foregoing principles and objects of the invention, an optical device structure having enhanced resistance to damage by invasive laser radiation is described which comprises a thin layer of optical switching material, such as $VO_2$, deposited onto a lattice matched substrate. A method for fabricating the structure is also described.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
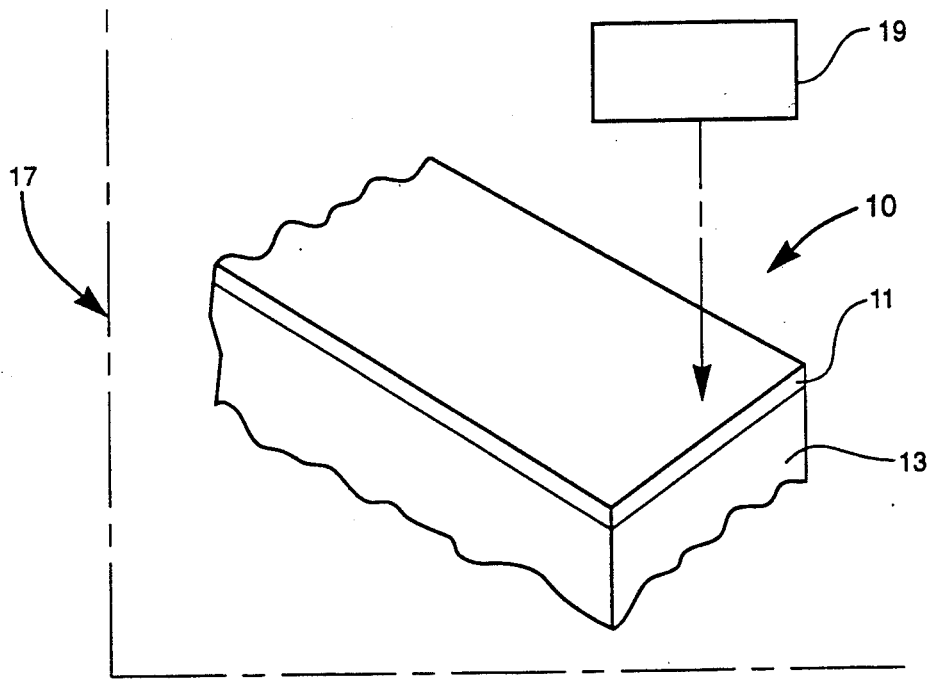
FIG. 1 illustrates a thin layer deposited onto a substrate in accordance with the invention.

Referring now to FIG. 1, shown schematically therein is a representative structure 10 according to the invention including a thin film or layer 11 deposited onto substrate 13. In accordance with a governing principle of the invention, structure 10 may comprise an element of an optical filter or other device for blocking potentially damaging electromagnetic radiation in preselected wavelength ranges. Layer 11 therefore comprises optical switching material. Although various switching materials may be applicable to the invention as would occur to one with skill in the field of the invention guided by these teachings, $VO_2$ is a preferable material and is the example used in demonstration of the invention. Various other known switching materials may not have either a transition temperature appropriate for optical switching device applications or a characteristic coefficient of thermal expansion and crystallographic structure matchable to useful substrate materials. Switching materials (and characteristic transition temperatures) which may be useful in the invention alternative to $VO_2$ may include $V_2O_3$ (−123° C.), VO (−160° C.), $NbO_2$ (900° C.), $Fe_3O_4$ (−150° C.) and $Ti_2O_3$ (315° C.), either in the pure or doped states.

Resistance of structure 10 to damage from invasive laser radiation is substantially enhanced according to the invention by depositing $VO_2$ as layer 11 onto a substrate 13 which has a surface 15 presenting a crystal lattice which is matched to that of the $VO_2$ as deposited in layer 11 form. When $VO_2$ deposition is performed according to the invention, details of the method being presented more fully below, the resulting layer 11 is a highly oriented polycrystalline layer similar in structure to that of a single crystal. As deposited, $VO_2$ assumes the tetragonal structure characteristic of the switched state. Substrate 13 material selection is therefore dependent first on the desired lattice matching and further on the spectral transmission and thermal expansion characteristics of the candidate substrate material. A substrate material useful in conjunction with $VO_2$ is (0001) sapphire, and was used in demonstration of the invention. This material has substantial transparency to wavelengths below five microns. Other substrate materials (and wavelength ranges of substantial transparency) which may be lattice matched with and therefore useful in conjunction with $VO_2$ include rutile $TiO_2$ (0.4 to 6 microns) and $CrO_2$, CdTe, $CaF_2$ and MgO (3 to 20 microns), as well as any of the numerous oxides with characteristic rutile or carborundum structures isostructural with the selected layer 11 transition material, such as $CrSbO_4$, $AlSbO_4$, $AlTaO_4$, $GaSbO_4$ and $CrVO_4$.

Layer 11 depositions in demonstration of the invention were performed in a stainless steel, copper gasketed ultra-high vacuum system 17, shown schematically by peripheral broken line in FIG. 1, capable of being pumped to pressures less than $10^{-8}$ Torr. Deposition means 19 used in the demonstrations comprised both reactive electron beam evaporation and reactive ion beam sputtering. Other deposition means occurring to the skilled artisan as useful in producing acceptable damage resistant layers according to the invention include magnetron sputtering, ion-assisted electron beam evaporation, chemical vapor deposition and laser ablation. Deposition parameters for controllably depositing each suitable layer 11 material to desired thickness utilizing any of the suggested deposition means 19 are well known to the skilled artisan. Films of $VO_2$ useful as protective coatings for optical devices range in thickness from about 0.2 to 1 micron. In practicing the invention, $VO_2$ layers 11 of about 0.2 to 0.6 micron thickness (as determined, e.g., by stylus profilimetry or calibrated crystal monitoring) may be successfully deposited on (0001) sapphire with substantially improved laser damage resistance compared to layers of conventional structure and thickness. Layers 11 deposited according to the invention were generally smooth, uniform, highly adherent to the substrates and highly stable in ambient atmosphere (i.e. showed no spectral degradation from water absorption or loss of cosmetic integrity on standing for an extended period of time).

Damage tests on layers 11 deposited according to the invention showed that damage resistance of a fabricated structure 10 may be further enhanced through careful substrate surface preparation prior to layer 11 deposition, such as by ion sputter cleaning, acid etch, solvent cleaning or vacuum annealing, each individually or in conjunction with surface polishing.

Figure 2:
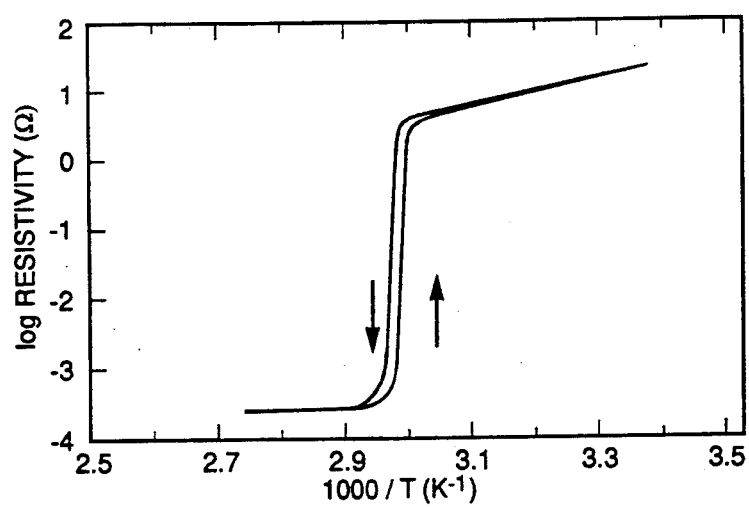
FIG. 2 shows a plot of resistivity versus temperature of a $VO_2$ layer deposited onto (0001) sapphire according to the invention using electron beam evaporation.

FIG. 2 is a plot of resistivity versus temperature of a $VO_2$ layer deposited on (0001) sapphire using electron beam evaporation. Electrical measurements were made at temperatures from 25° to 95° C. using the van der Pauw four-point resistivity method. In the low temperature semiconducting phase, resistivity gradually decreases with increasing temperature to the transition temperature where a sharp drop in resistivity of about $10^4$ to $2 \times 10^4$ occurs. The ratio of resistivities at 90° and 35° C. is a measure of electrical switching performance; ratios for the demonstration layers typically were $3 \times 10^4$ to $4 \times 10^4$. The transition temperature on heating $VO_2$ may differ from that upon cooling, the hysteresis being characteristic of both thin layers and single crystals. The demonstration layers had typical hysteresis widths of only 2° to 4° C. Layers 11 deposited on (0001) sapphire using reactive ion-beam sputtering showed qualitatively very similar electrical characteristics.

Figure 3:
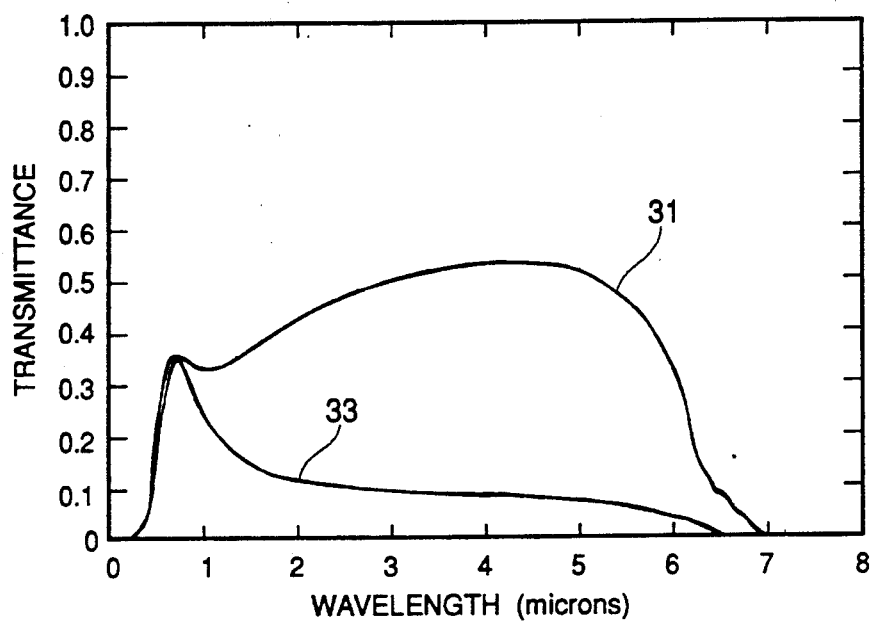
FIG. 3 shows optical transmission spectra of an 80-nm $VO_2$ layer prepared in a manner similar to that of the FIG. 2 layer.
Figure 4:
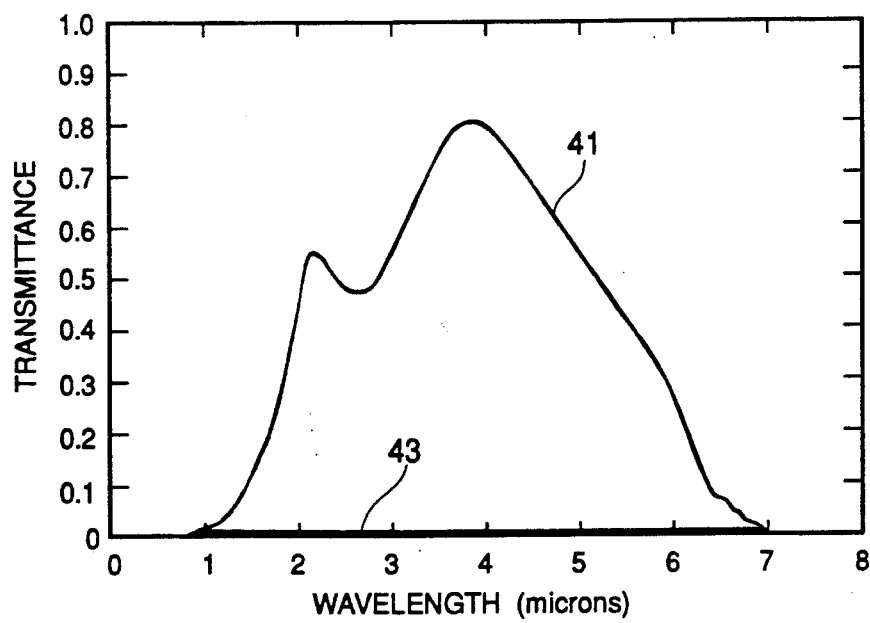
FIG. 4 shows optical transmission spectra of a 614-nm $VO_2$ layer on (0001) sapphire deposited similarly to FIG. 3 layer.
Figure 5:
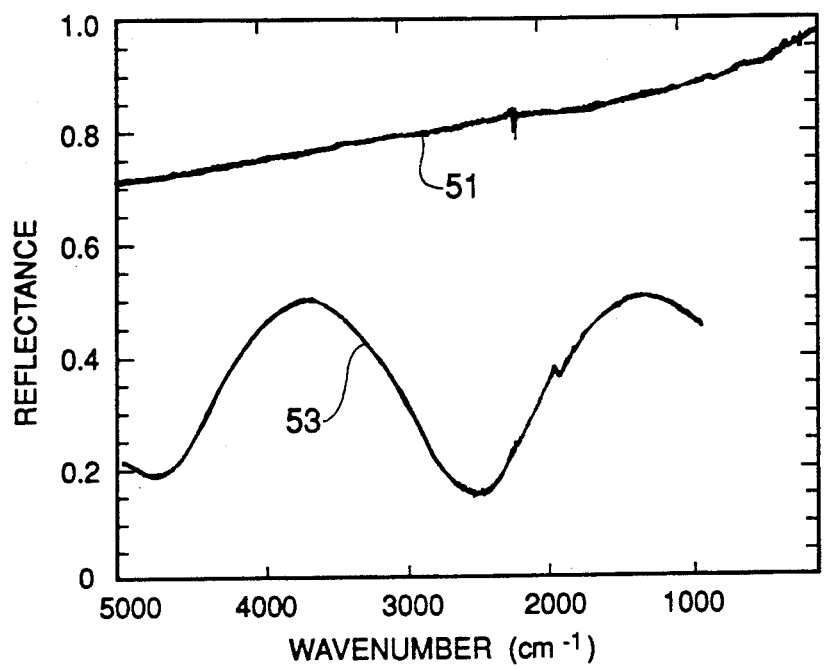
FIG. 5 shows reflectance spectra of the FIG. 4 layer.

FIG. 3 shows optical transmission spectra of an 80-nm $VO_2$ layer deposited in a manner similar to that of the layer of FIG. 2. Curve 31 is the spectrum of the low temperature unswitched layer and curve 33 is that of the high temperature switched layer. The sharp decrease in transmittance above five microns for the unswitched layer is attributable to the sapphire substrate. It is noted that both curves 31,33 show a sharp drop in transmittance near 0.4 micron. By comparison, FIG. 4 shows the optical transmission spectra of a 614-nm $VO_2$ layer on (0001) sapphire deposited similarly to the 80-nm layers. Curve 41 is the spectrum of the unswitched layer and curve 43 that of the switched layer. FIG. 5 shows the corresponding reflectance curves for the FIG. 4 layer. Curves 51,53 are spectra of the switched layer and unswitched layer, respectively.

Figure 7:
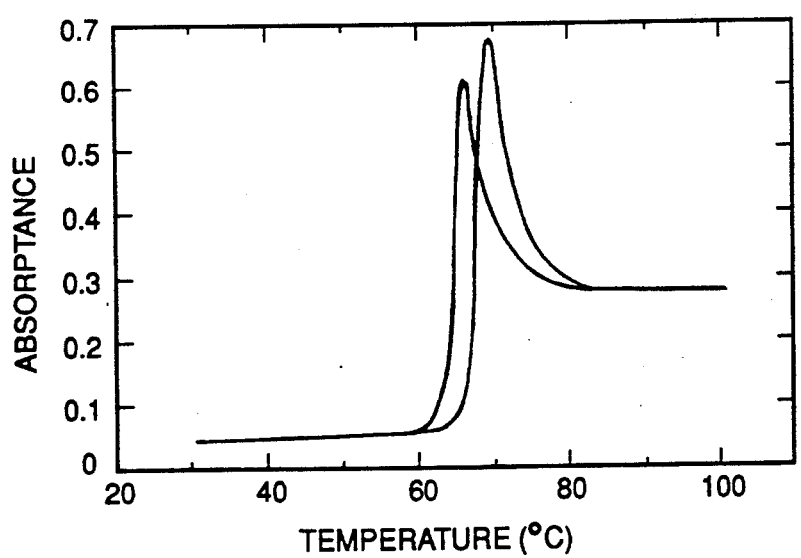
FIG. 7 shows effective absorption versus temperature for the layer of FIGS. 6a and 6b.
Figure 6A:
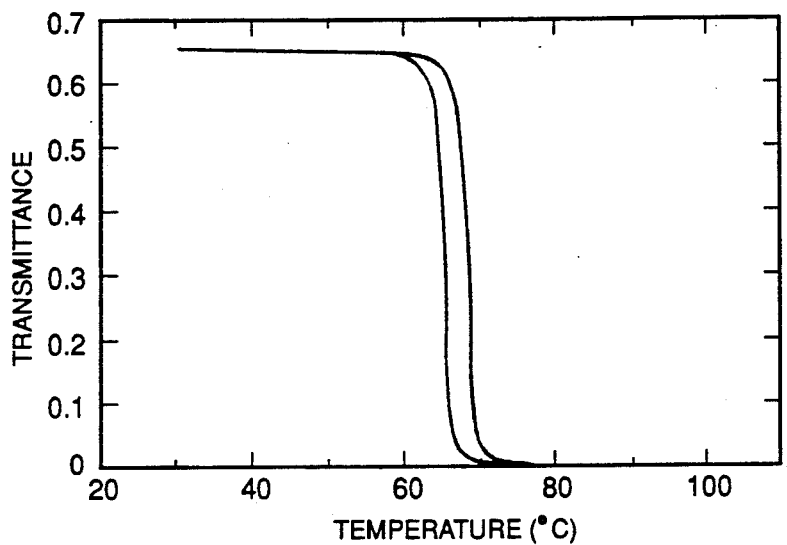
FIGS. 6a and 6b show temperature dependence of the infrared transmittance and reflectance at 3.39 microns of an electron beam deposited layer.
Figure 6B:
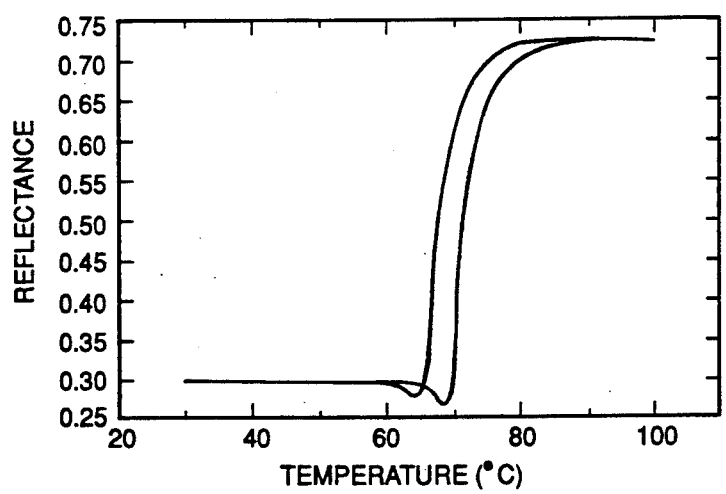

FIGS. 6a and 6b show temperature dependence of the infrared transmittance and reflectance, respectively, at 3.39 microns of an 80-nm electron beam deposited layer. The sharp drop in transmittance (FIG. 6a) and corresponding sharp rise in reflectance (FIG. 6b) occurring at the transition temperature along with the characteristic hysteresis width were comparable to the electrical observations. The increase in reflectance does not, however, quantitatively correspond to the decrease in transmittance at the equivalent temperature. When the data are used to calculate effective layer absorption, an anomalous increase occurs during phase transition (FIG. 7) which is not apparent from either transmission or reflection switching measurements alone, and which can be attributed to the transient changes occurring in the apparent imaginary index of refraction.

The invention therefore provides a layer structure and method for making same having enhanced damage resistance to invasive laser irradiation. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical device for selectively blocking laser radiation, comprising:
    (a) a layer of a transition material having a substantially optically transmissive electrically insulating phase below a characteristic transition temperature and a substantially opaque electrically conducting phase above said characteristic transition temperature; and
    (b) a substrate supporting said layer, said substrate having a characteristic crystal structure and defining a surface upon which said layer is deposited, said surface defined by a crystal plane of said crystal structure presenting a lattice structure which matches that of said layer.

2. The structure of claim 1 wherein said layer comprises a material selected from the group consisting of $VO_2$, $V_2O_3$, $VO$, $NbO_2$, $Fe_3O_4$ and $Ti_2O_3$.

3. The structure of claim 1 wherein said substrate comprises an oxide which is isostructural with said transition material.

4. The structure of claim 1 wherein said substrate comprises a material selected from the group consisting of sapphire, $TiO_2$, $CrO_2$, $CdTe$, $CaF_2$, $MgO$, $CrSbO_4$, $AlSbO_4$, $AlTaO_4$, $GaSbO_4$ and $CrVO_4$.

5. The structure of claim 2 wherein said layer has thickness of about 0.1 to 1 micron.

6. A method for fabricating a structure for selectively blocking laser radiation, comprising the steps of:
    (a) providing a source of transition material having a substantially optically transmissive electrically insulating phase below a characteristic transition temperature and a substantially opaque electrically conductive phase above said characteristic transition temperature;

(b) providing a substrate for supporting said layer said substrate having a preselected characteristic crystal structure;

(c) providing a surface on said substrate defined by a crystal plane of said crystal structure presenting a lattice structure which matches that of said transition material; and (d) depositing a layer of said transition material to preselected thickness onto said surface of said substrate.

7. The method of claim 6 wherein said layer comprises a material selected from the group consisting of $VO_2$, $V_2O_3$, $VO$, $NbO_2$, $Fe_3O_4$ and $Ti_2O_3$.

8. The method of claim 6 wherein said step of depositing said transition material as said layer is performed using one of reactive electron beam evaporation, reactive ion beam sputtering, magnetron sputtering, ion-assisted electron beam evaporation, chemical vapor deposition and laser ablation.

9. The method of claim 6 wherein said substrate comprises an oxide which is isostructural with said transition material.

10. The method of claim 6 wherein said substrate comprises a material selected from the group consisting of sapphire, $TiO_2$, $CrO_2$, $CdTe$, $CaF_2$, $MgO$, $CrSbO_4$, $AlSbO_4$, $AlTaO_4$, $GaSbO_4$ and $CrVO_4$.

11. The method of claim 6 wherein said transition material is deposited as said layer to a thickness of about 0.1 to 1 micron.

* * * * *